Figure 14:
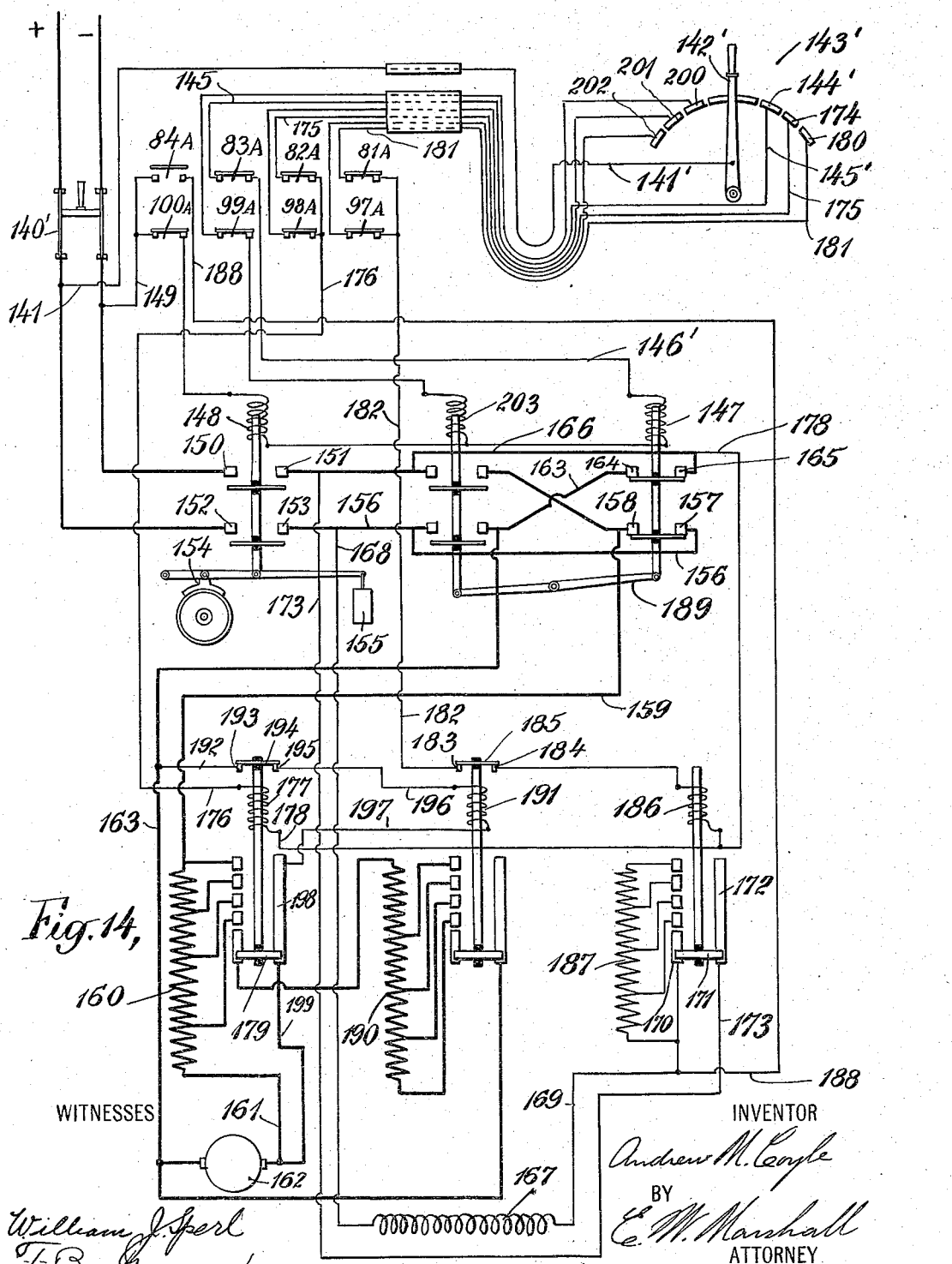

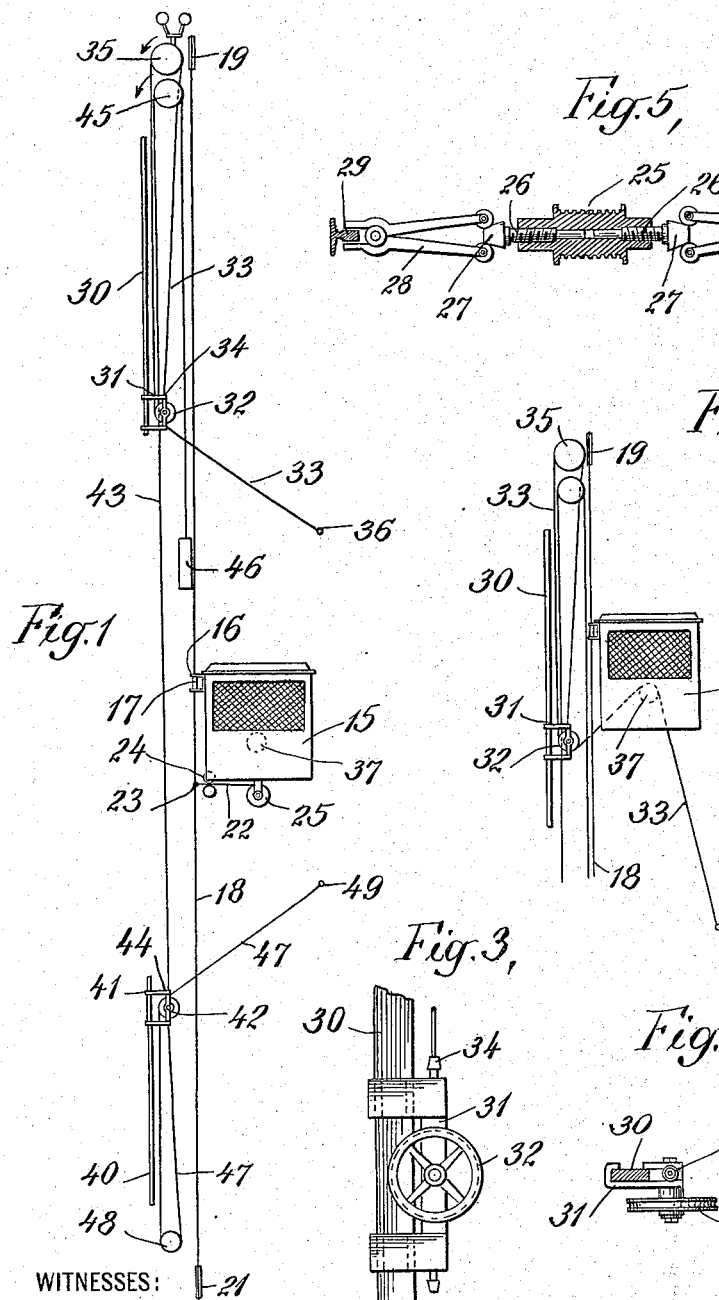

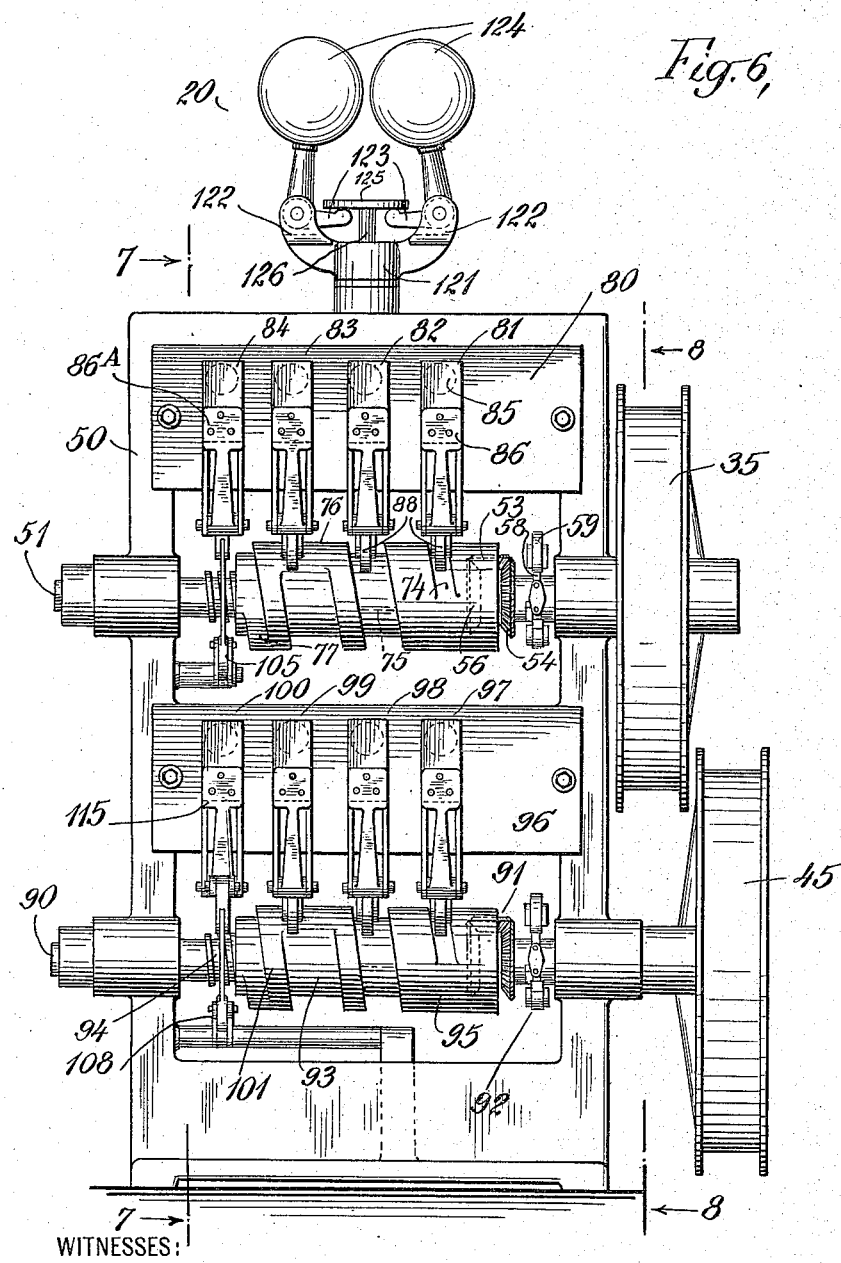

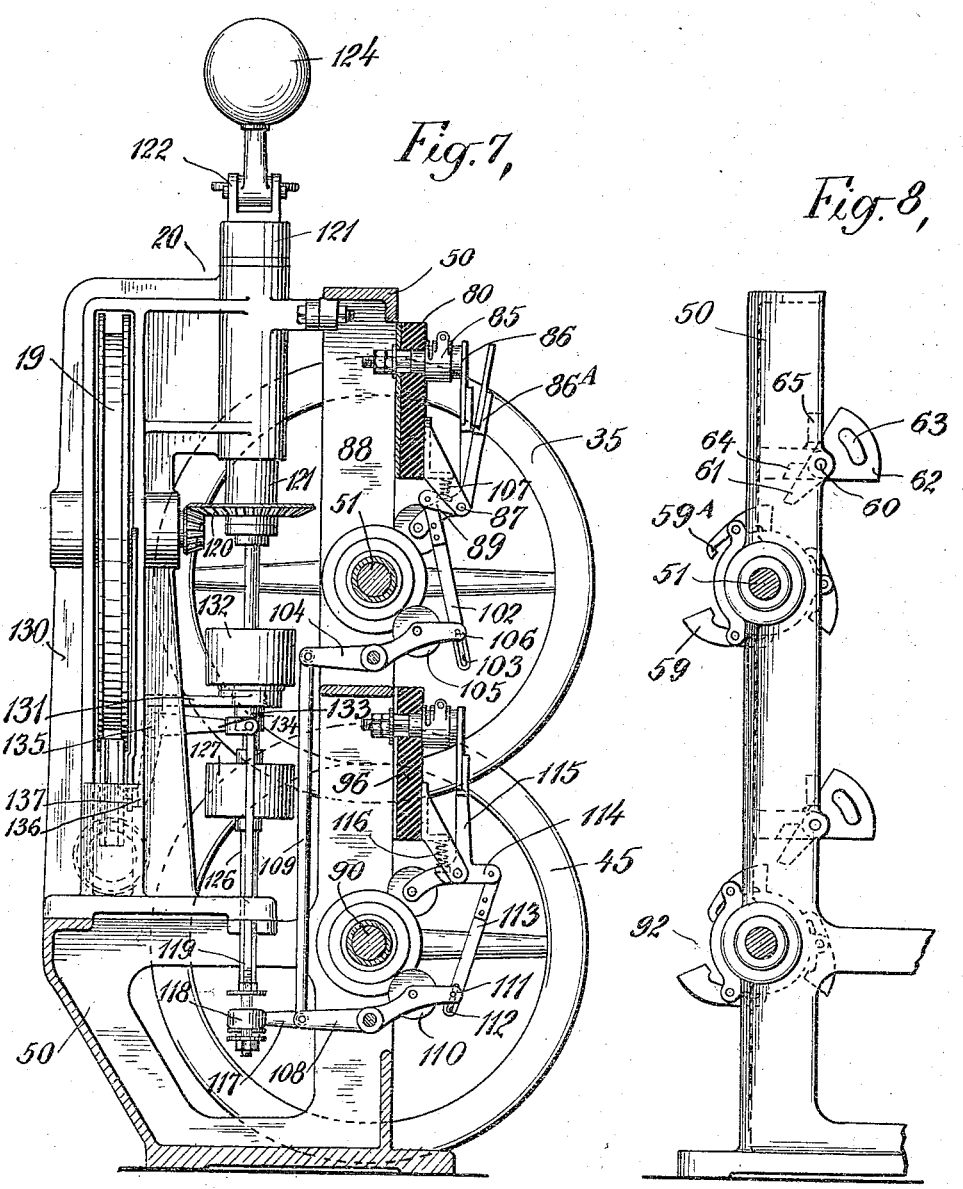

A. M. COYLE.
ULTIMATE LIMIT STOP FOR ELEVATORS.
APPLICATION FILED APR. 26, 1912.
1,171,095.
Patented Feb. 8, 1916.
5 SHEETS—SHEET 4.
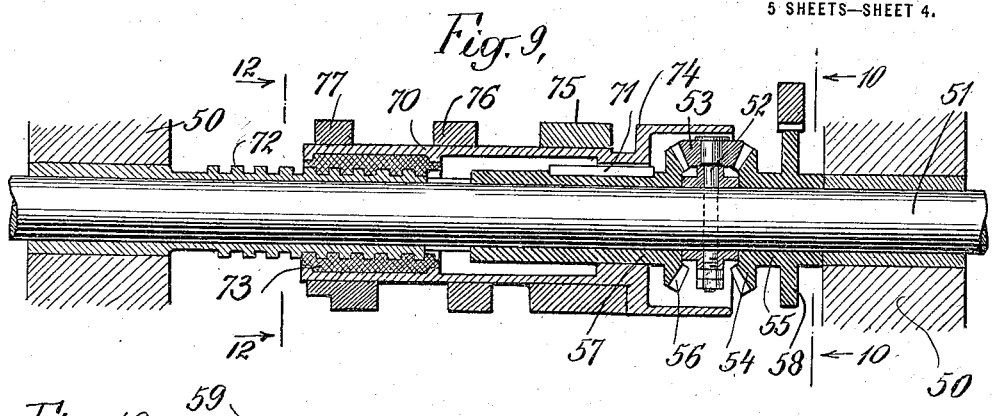
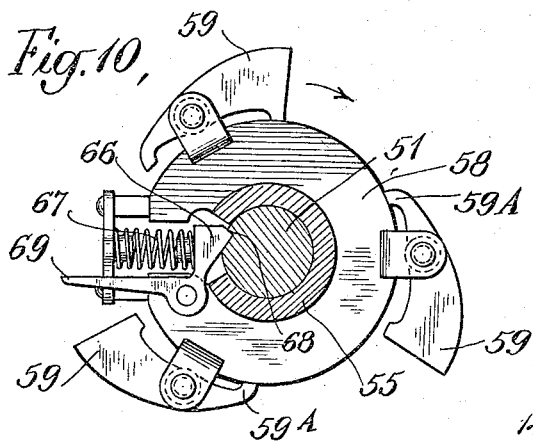
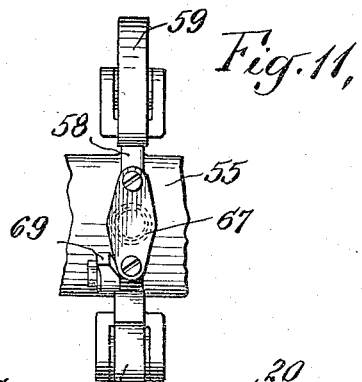
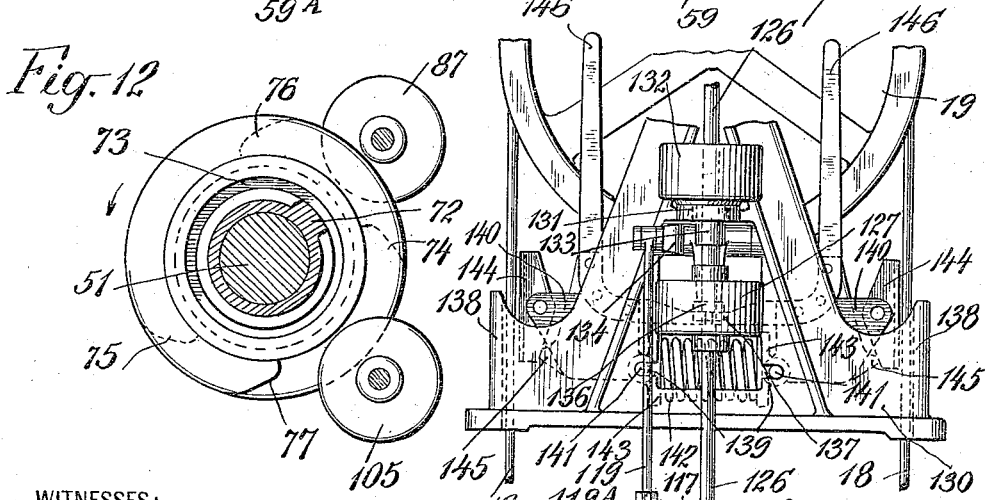
WITNESSES:
William J. Sperl
F. B. Graves
INVENTOR
Andrew M. Coyle
BY
E. W. Marshall
ATTORNEY

A. M. COYLE.
ULTIMATE LIMIT STOP FOR ELEVATORS.
APPLICATION FILED APR. 26, 1912.

1,171,095.

Patented Feb. 8, 1916.
5 SHEETS—SHEET 5.

WITNESSES

INVENTOR
Andrew M. Coyle
BY
E. W. Marshall
ATTORNEY

UNITED STATES PATENT OFFICE.

ANDREW M. COYLE, OF NEW YORK, N. Y., ASSIGNOR TO GURNEY ELECTRIC ELEVATOR COMPANY, OF HONESDALE, PENNSYLVANIA, A CORPORATION OF PENNSYLVANIA.

ULTIMATE-LIMIT STOP FOR ELEVATORS.

1,171,095.  Specification of Letters Patent. Patented Feb. 8, 1916.

Application filed April 26, 1912. Serial No. 693,326.

*To all whom it may concern:*

Be it known that I, ANDREW M. COYLE, a citizen of the United States of America, and a resident of the city, county, and State of New York, have invented certain new and useful Improvements in Ultimate-Limit Stops for Elevators, of which the following is a specification, reference being had to the accompanying drawings, forming a part thereof.

My invention relates to that class of apparatus which is used to stop an elevator car automatically at the ends of its path of travel and its object is to provide a device by means of which the car will be brought to rest surely and safely and which will act positively to stop the car under any or all contingencies which can be foreseen.

I will describe my invention in the following specification in which the manner in which I attain the aforesaid result will appear as will also other advantages of my improved apparatus over such arrangements as have heretofore been known.

The novel features of this invention will be set forth in appended claims.

Referring to the drawings in which an embodiment of my invention is illustrated, Figure 1 is a diagrammatic representation in elevation of an elevator car and certain associated mechanisms. Fig. 2 is a similar view of the car and some of the mechanisms shown in Fig. 1 with the parts in different relative and operative positions. One of the traveling rope sheaves with its supporting frame and guide is shown on a somewhat enlarged scale in front elevation and in plan view in Figs. 3 and 4 respectively. A common type of elevator car safety device such as may be used in conjunction with my invention is shown in Fig. 5 in plan view partly sectioned. Fig. 6 is a front elevation of an electro-mechanical stop-motion mechanism which forms a part of the present invention. Fig. 7 is a sectional end elevation of the same apparatus, the section in this figure being taken on the line 7—7 of Fig. 6 looking in the direction of the arrows. Another sectional end elevation of a part of this same device is shown in Fig. 8, the section in this case being on the line 8—8 of Fig. 6, looking in the direction of the arrows but omitting the rope sheaves. A vertical section of the parts mounted upon and associated with one of the rope sheave shafts is shown on an enlarged scale in Fig. 9. Figs. 10 and 11 are an end elevation and a front elevation respectively, on a still larger scale of a speed governor, one of which is mounted on each of the rope sheave shafts. The section of the shaft and the hub of the governor disk in Fig. 10 is taken on the line 10—10 of Fig. 9. Another sectional end elevation on the line 12—12 of Fig. 9 is shown in Fig. 12. Fig. 13 is a side elevation of the lower portions of the main speed governor, showing some of the details of its construction. Fig. 14 is a wiring diagram of an electric elevator control system with my invention applied thereto.

Like characters of reference designate corresponding parts in all of the figures.

On the first sheet of the drawings an elevator car is shown at 15. From the side of this car projects a light leaf spring 16 which is arranged to engage a stop ball 17 on an endless rope or cable 18 which runs over a sheave 19 on the main speed governor 20, which is shown more in detail in Figs. 7 and 13. This rope which will hereinafter be called the governor rope is carried down under a sheave 21, which is usually weighted to keep the governor rope under tension. The spring 16 is of sufficient strength to carry the stop-ball 17 and to cause the governor rope to travel with the car under normal conditions, but it is light enough to release the stop ball and allow the car to have a movement relative to the governor rope when the latter is held in the manner which will be described hereinafter.

22 is an auxiliary rope which is affixed to the governor rope at 23, which passes between a pair of pulleys 24 on the car and is wound around a drum 25 which forms a part of the car safety device. A common type of car safety device is illustrated in Fig. 5. In this form the drum 25 is internally threaded to receive right and left hand screws 26 on the outer ends of which are wedges 27. These are so arranged that when the drum is rotated, as it will be by the unwinding of the rope 22 when the governor rope is held stationary and the car moves relatively thereto, the screws 26 will be moved apart and the wedges 27 will be forced between the ends of pivoted levers 28. This will cause the outer ends of these levers to be forced onto and to clamp the guides 29 over which the car runs, to bring the car to rest.

The foregoing brief description is deemed sufficient for the present case as the apparatus described is well known and of itself is not a part of my invention.

30 designates a vertical track in the upper part of the hatchway on which is mounted a movable frame 31. On this frame is rotatably supported a sheave 32. One end of a rope 33 is affixed to this movable sheave frame at 34 and is carried up and over a sheave 35 on the stop motion device, about which it is given several convolutions and to which it may be affixed. From thence it is led down to and under the sheave 32 and across the elevator hatchway in a vertical plane near one of the sides of the car 15, to a point 36 where it is fastened.

On the side of the car a sheave 37 is mounted in such a position that when the car moves upward, it will engage that part of the rope 33 which is between the sheave 32 and the fixed point 36. In the lower part of the hatchway is another vertical track 40 on which is a frame 41 supporting a sheave 42. 43 is a rope affixed to the frame at 44. This is led up and over a sheave 45 directly under sheave 35, and then down to a weight 46 which is heavier than the frame 41 and the parts which it supports and therefore tends to keep this frame at the upper end of the guide 40. Another rope 47 is affixed to the lower portion of frame 41. This rope is carried down and under a sheave 48, thence up and over the sheave 42 and across the elevator hatchway to a fixed point 49 where its other end is fastened. This rope is also in the path of movement of the car sheave 37. Before describing the other parts of the apparatus herein shown, I will point out the operation of these actuating ropes. As the car ascends, the car sheave 37 will at a predetermined point of the travel of the car, engage the rope 33. Then as the car continues its upward movement, it will form a bight in the rope and begin to move the sheave frame 31 upward. The relative positions of these devices when this part of the operation is being performed are illustrated in Fig. 2. It is to be noted that there will be no jar or sudden strain put upon the rope 33 and the parts with which it co-operates but that the initial engagement of the sheave 37 with the rope 33 is an easy one and that the movement imparted to the rope and the parts which it actuates is started gradually. This engagement of the car sheave with the actuating rope and the further movement of the elevator car causes the sheave 35 to be rotated in the direction indicated by the arrow at a rate substantially proportional to that of the car. This as will fully appear hereinafter, is arranged automatically to bring the car to rest. When the car descends, the operation pointed out will be reversed and the weight of the sheave 32 and its supporting frame will cause the parts thus moved to assume their initial positions, that is those in which they are shown in Fig. 1. Similarly, the downward movement of the car will at a predetermined point bring the car sheave 37 into engagement with the rope 47 and will cause the sheave 42 and its frame to move downward. By the movement of these parts the sheave 45 will be rotated in the direction indicated by the arrow, and at the same time the weight 46 will be raised. The movement of sheave 45 is also arranged to stop the car. When the car ascends the weight 46 will pull back the parts thus moved to their initial positions. The sheave 35 is fast on a shaft 51 suitably journaled in a frame 50 through which shaft passes the spindle 52 of a miter gear 53, which meshes with a miter gear 54 on a hub 55 and with a similar gear 56 on a collar 57. From the hub 55 projects a disk 58 which carries on its periphery a plurality of pivoted weighted pawls 59. During the rotation of the disk 58 these pawls drop away from the disk an amount limited by tail-pieces 59$^A$ until they reach the upper portion of their path of travel when they drop back by their own weight into the position in which the upper pawl 59 in Fig. 10 is shown. The pawls will not drop back however when the rate of rotation of the disk 58 becomes great enough to cause centrifugal force to counteract their gravity weight. These parts form what for the purpose of distinguishing from the main governor 20, I will call a secondary speed governor.

In Fig. 8 is shown a member which is pivoted at 60 to the frame 50 and which comprises a finger 61 projecting into the path of travel of the pawls 59, but not a sufficient distance to be engaged by them unless they are held out by centrifugal force. On the other side of its pivot this member has a sector-like portion 62 from the side of which projects a lug 63. These parts are of sufficient weight to maintain the finger 61 against a stop piece 64 on frame 50 and to hold it in the desired position under normal conditions. When one of the pawls 59 strikes the finger 61, the pivoted member will be swung about its pivot until the lug 63 strikes a stop piece 65 in the frame when further movement of it and the collar 55 will be arrested. This performs an important function as will appear later. The collar 55 is caused to travel with the shaft 51 unless its movement is arrested by the action of the secondary governor, according to the foregoing description, not only by the engagement of gears 53, 54 but also by a latch 66, which is pivotally mounted on the disk 58 and is pressed by a spring 67 into a notch 68 in shaft 51. 69 is a thumb piece projecting from the latch by means of which the latch may be manually released in resetting the device. A tubular member 70 surrounds the collar 57 and projects over the gears 53 and 56. One end of this member is mounted upon the collar 57 but is keyed thereto as at 71. It is therefore arranged to rotate with the collar but is free to slide over it longitudinally. Under usual conditions the collar 57 rotates with the shaft 51 on account of the engagement of gears 53, 56, but it is also free to rotate about the shaft. The key is fixed on the periphery of the collar and fits a longitudinal groove in the tubular member 70. The other end of the tubular member is supported on an externally threaded fixed bushing 72 which is supported in the frame 50 and the inside of which is bored to form one of the bearings of the shaft 51. 73 designates a babbitted lining for the tubular member and fits the threads on bushing 72 so that when the member 70 rotates, a longitudinal movement is imparted to it. The member 70 supports a plurality of spiral shaped cams 74, 75, 76 and 77 which are arranged to actuate certain electrical switches which will now be described. A plate 80 of insulating material is affixed to the frame 50 and forms a supporting base for the switches of which four are shown. Three of these switches designated by 81, 82, 83 are normally closed and each comprises stationary contacts such as 85 and switch arms such as 86 which arms are pivoted as at 87. Each of these three carries a roller such as 88 which engages with one of the cams on the tubular member 70. The fourth switch 84 is normally open. The switch arm 86$^A$ of this fourth switch is pivoted like the others, but terminates in a short lever 89 which is connected with certain links, rods and arms as is shown in Figs. 6 and 7. The rope sheave 45 is mounted on a shaft 90 similar to shaft 51 journaled in the same manner in frame 50 directly below the shaft 51. This shaft 90 actuates gearing 91 similar to that described and carries a secondary governor 92 like that on shaft 51. It also carries a tubular member 93 one end of which is supported on a threaded bushing 94, and cams 95. An insulated plate 96 carries switches 97, 98, 99 and 100. These parts are similar to those associated with shaft 51 and so need no further description. The switch 100 however, unlike switch 84, is a normally closed switch. The switches 81, 82, 83 are each independently opened by the cams 74, 75, 76 respectively, and the switches 97, 98, 99 are similarly actuated by cams under them. The switch 84 is however connected by mechanism which will now be described with the switch 100 and both of these switches are arranged to be actuated by either the cam 77 on shaft 51 or by cam 101 on shaft 90, or by the main governor 20.

It has already been noted that the end of switch arm 86$^A$ terminates in a short arm 89. From the latter a connection rod 102 depends which terminates in a slot 103. 104 is a rocker arm pivoted in the frame 50. On one side of its pivot is a roller 105 which is arranged to be engaged by the cam 77. On the same end of arm 104 is a pin 106 which projects into slot 103 which pin when the parts are in the position in which they are shown in Fig. 7, holds switch 84 open against the action of a compression spring 107. Another rocker arm 108 also pivoted in frame 50 is connected to move with arm 104 by a rod 109. On the other side of its pivot, arm 108 carries a roller 110 which is arranged to be engaged by cam 101 on shaft 90. An extension of arm 108 carries a pin 111 which projects into a slot 112 in the end of an arm 113 which depends from a lug 114 projecting from switch arm 115 of switch 100. A compression spring 116 tends to hold this switch closed. A branch 117 of rocker arm 108 terminates in a collar 118 which surrounds a rod 119 depending from the main speed governor 20.

I will now describe the main speed governor and point out its parts. The rope sheave 19 is connected through gears 120 to drive a vertical sleeve 121 at a speed proportional to the speed of the car 15. At the top of this sleeve are a pair of forked ears 122. In each of these ears is pivoted a bell crank lever each of which has a short substantially horizontal arm 123 and a substantially vertical arm terminating in a ball or weight 124. When these balls are rotated at a predetermined rate they are thrown outward by centrifugal force and this causes the short arms 123 to raise a disk 125 on the upper end of a vertical rod 126. A weight 127 affixed to the rod opposes such upward movement. This rod extends down through the governor and through a collar 128 which is on an extension of the rocker arm 108. On the end of rod 126 under collar 128 is washer adjustably supported by a nut 129. It may be seen therefore that any upward movement of the governor rod 126 imparts movement to the rocker arms 108 and 104.

The main governor mechanism is supported on a frame 130 which rests upon and is affixed to the frame 50. A bracket 131 projects from the frame 130 and supports a supplemental weight 132 which surrounds rod 126. A part 133 of weight 132 projects down through the bracket and into the path of movement of the upper part of weight 127.

134 is an arm which is a part of a bell crank lever. This lever is pivoted in frame 130

130 at 135. Its other arm extends down as at 136 and forms a latch over two extensions 137 of a pair of rope locking members which I will now describe. The rod 119 depends from the end of the arm 134 and carries on its end a sleeve with washers 119$^A$ and 119$^B$ above and below the collar 118. The positions of these washers on the rod are adjustable. The opposite sides of frame 130 are constructed to form fixed abutments 138 within which the two parts of the governor rope 18 run with some clearance. Another part of the governor frame is constructed to form a pair of oppositely disposed horizontal slot-like pockets 139.

The locking members themselves are designated by 140. Each of them is loosely pivoted on a pin 141 and these pins rest in the pockets 139. These pins are pressed into the pockets by a spring 142 on the ends of which are collars 143 from which project lugs which surround the pins 141. On the other ends of the locking members are loosely pivoted brake shoes 144 which are grooved to fit the rope 18 and which are held with their grooved portions in vertical position when the parts are in the positions in which they are shown in Fig. 13 by lugs 145 against which the shoes rest.

146 are handles affixed to the locking members, the lower ends of which form the projections 137 under latch 136.

The mechanical parts of this apparatus have been described and I will now proceed to explain their operation. Let us assume that the car in going up has engaged the rope 33 and has thereby imparted rotation to the sheave 35. This rotation of the sheave will be imparted through its shaft to the tubular member 70 and to the cams on it. At the same time these cams will be moved to the left on account of the threaded engagement of the member 70 with the bushing 72. The first effect of this will be to cause cam 74 to engage the roller 88 on the first switch 81 to open the latter. This as will be explained later, has the effect of slowing down the elevator. Further movement of the car and shaft 51 will cause cam 75 to open switch 82 which has a further retarding effect on the elevator. It is to be noted at this point that cam 77 has not been moved far enough to the left to engage roller 105 on switch 84. The next operation is the opening of switch 83 by cam 76. By this time the cam 77 has been moved to the left far enough to engage roller 105 which it does if the car has not stopped and the shaft 51 continues its rotation. The effect of an outward movement of this roller 105 is to move pin 106 away from the end of slot 103 which allows spring 107 to close switch 84. Under all normal conditions the first three of these operations will bring the car 15 to rest gradually. These operations automatically perform in three steps just what the operator in the car would do to stop.

If the car were running down, it would as it approached its lower limit of travel, engage rope 47 and rotate sheave 45 and its shaft and cams. In a manner similar to that above described this would cause the switches 97, 98 and 99 consecutively to be opened. The fourth step however, that is the engagement of cam 101 with roller 110 does not affect switch 100, but through the connections described causes the closure of switch 84. If either shaft 51 or 90 rotates after switch 84 has been closed, their cams will open switch 100 and will trip the governor to apply the car safety device. When the car again moves away from the ends of its path of travel, the parts thus actuated will be restored to their initial positions. Now let us assume that the car is going up and actuating sheave 35, and is for some reason running at a greater speed than it should. This abnormal speed will cause the pawls 59 on the secondary governor to remain in their outward position so that one of them will engage the finger 61 and the movement of the collar 55 and gear 54 will thereby be arrested. The effect of this will be to rotate gear 53 about its pivot and to impart this rotation to gear 56 and the cams on member 70 in addition to the rotation imparted to these parts by the rotation of shaft 51. Consequently the switch 81 will be closed sooner than it would be if the secondary governor had not acted and the other switches 82, 83, 84 will be closed in quicker succession. A similar result will of course occur at the lower part of the car's travel. By this novel arrangement there is provided means for more quickly applying the slow down and stopping agencies to the car, when the car approaches the ends of its travel more rapidly than it should. Therefore these agencies which under normal conditions might be set to be brought into action during say twenty feet of the car's travel will be actuated in about half of this distance. This then greatly minimizes the danger of the car over-running its path of travel. But I go still farther and arrange a connection between the main speed governor and the stop motion device which provides a further element of safety. Between the collar 118 and the washers which are shown on rod 119 is a considerable amount of lost motion. This allows for the movement of the rocker arm 108 imparted to it by the cams 77 and 101. But whether such motion has been given the rocker arm 108 or not, the arrangement is such that if the speed of the car becomes great enough to cause the governor to raise its weight 127, the rod 126 will raise rocker arm 108 and the parts which are connected with it a sufficient amount to cause switch 84 to be closed. The weight 127 is so proportioned that it will be raised as soon as the speed of the car slightly exceeds that at which it is designed to run. Unless the car's speed is excessive the upward movement of the governor rod 126 will be arrested when the upper part of weight 127 abuts against the lower part of weight 132. The effect of opening switch 84 is as will be more fully described, to slow down the car. But if for any reason the speed of the car still increases, the governor will also lift the weight 132. In such a case it will have two effects. The further upward movement which the rods 126 and 119 will then have will cause pin 111 to engage the bottom of slot 112 to pull open switch 100 and this switch is arranged to cut off all supply from the driving motor of the elevator and from all the control devices therefor. At the same time the collar 118 will strike against washer 119$^A$ and will push up arm 134 which will release latch 136 from the extensions 137 and will allow the locking members 140 to drop. The brake shoes 144 will thus be thrown against the two parts of the governor rope 18 and will engage and lock one or the other of these parts of the rope. For example if the part of the governor rope 18 which is on the right hand side of Fig. 13 is the part which is going down, it will be caught between the brake shoe 144 and the fixed abutment 138 on that side. The resiliency of the spring 142 will prevent the shoe from injuring the rope, but the latter will be held against further movement and this will as previously described, apply the car safety device to lock the car to the guide rails 29. With an elevator equipped with these devices there is I believe, no possibility of its over-running the limits of its path of travel.

In order to more clearly show how this invention may be used a diagram of certain control devices and their connecting circuits is submitted herewith as Fig. 14 of the drawings. I will proceed to describe this diagram but it is to be understood that this invention is not limited to its use in conjunction with the specific devices shown therein or with this particular arrangement of the circuits. + and − designate mains from a suitable source of electrical supply which after passing through a main line switch 140′, are connected with various parts of the apparatus. A conductor 141′ runs from the positive main to the lever 142′ of a car switch 143′. This in its central position is neutral, but may be moved to one side or the other to make the car go up or down. Let us for example assume that the car switch lever is to be moved to the right to start the car up. The lever 142′ is first brought into contact with a stationary contact 144′ and this closes a circuit through wire 145′ through contacts 83$^A$ which are closed by switch 83, through wire 146′, magnet winding 147 of a reversing switch, thence through magnet winding 148 of a starting switch, thence through contacts 100$^A$ which are closed by switch 100 and to the negative main by wire 149. The starting switch will then close the main line by raising its core on which are supported disks which connect contacts 150, 151; 152, 153 respectively and will at the same time release brake 154 which has been applied to a pulley on some rotary part of the elevator mechanism by a weight 155. A circuit will now be closed through the motor armature as follows: From the positive main the current will flow through disk connecting contacts 152, 153, wire 156, contacts 157, 158 which are now bridged by a disk which has been raised by the reversing switch magnet 147, through wire 159, through starting rheostat 160 and wire 161 to the right hand side of the motor armature 162. Thence the current passes through wire 163, contacts 164, 165, which are now bridged, wire 166, and bridged contacts 151, 150 of the starting switch, to the negative main. At the same time the field winding 167 of the motor is energized by a current passing from the positive main through bridged contacts 152, 153, wire 168 to and through the field winding, through wire 169 to contact 170, across a sliding brush 171 to contact 172 and thence by wire 173 and bridged contacts 151, 150 back to the negative main. Consequently the motor will begin to rotate in one direction and by any of the usual mechanical connections will move the car in the desired direction. If the operator now moves the lever 142′ farther to the right onto contact 174, another circuit will be closed through wire 175 through contacts 82$^A$ closed by switch 82 wire 176 to and through winding 177 of the rheostat controller, thence through wires 178 and 166 to the negative main. This will energize magnet 177 and the latter will raise a sliding contact 179 up over a series of stationary contacts which are connected with rheostat 160 to gradually cut this resistance out of the armature circuit. The effect of this will be to give the motor armature more current and to cause it to rotate faster. A further movement of car switch lever 142′ to the right will bring it onto contact 180 which will close a circuit through wire 181, contacts 81$^A$ which are closed by switch 81, wire 182, contacts 183, 184 which are now bridged by contact 185, to and through magnet winding 186 and thence by wires 178, 166 to the negative main. When winding 186 is thus energized it will raise sliding contact 171 up over stationary contacts which are connected to a field resistance 187 which will weaken the motor field and cause the motor to run still faster.

It has previously been shown that whenever the speed of the elevator car runs somewhat faster than it should, the switch 84 will be closed automatically. This switch closes contacts 84^A. The field resistance 187 is interposed between the right hand terminal of the field winding and the negative main. But when contacts 84^A are closed, this resistance is short circuited by a wire 188, bridged contacts 84^A and wire 149 to the negative main. Therefore whenever contacts 84^A are closed the field 167 will have its maximum strength and the motor and car will run below their maximum speed.

The various steps for starting the motor and car and bringing them up to maximum speed have been described. It is obvious that these operations may be reversed by the operator. That is he may move lever 142' back off of contact 180 to break the circuit through magnet 186 which will cut out field resistance 187 to slow down the motor and car. This same circuit will be broken by the automatic opening of switch 81 to open contacts 81^A. Second the operator may move lever 142' back off of contact 174 to break the circuit through magnet winding 177 to allow the starting resistance 160 to be reinserted in the armature circuit, which will have a tendency to further slow down the motor and car. The automatic opening of switch 82 will do the same thing. Third the operator may bring lever 142' back to its central or neutral position in which case it will break the circuit through magnets 147 and 148. Fourth, the cam 77 will close switch 84 to bridge contacts 84^A thus short circuit field resistance 187, if the opening of switch 81 has for any reason failed to do so and if the car has not stopped before this cam engages the roller 105. In the particular arrangement shown, the reversing switch contacts will not be opened by the deënergization of magnet 147 but they will be maintained in their closed position by a pivoted arm 189. But the starting switch will be opened and the brake 154 applied to stop the motor and car. I have also shown a dynamic brake resistance 190 which is automatically applied to assist in bringing the motor to rest. This is controlled by a magnet winding 191 which will now be energized by the electromotive force generated by the continued rotation of the armature through the following circuit. Beginning at the left hand terminal of the armature, the circuit runs up through wires 163, 192 to contact 193 which when the sliding brush 179 is in its lowermost position, is bridged by disk 194 with contact 195, thence through wire 196 to and through magnet winding 191 and by wire 197 to contact 198 of the starting resistance controller, which contact is connected by wire 199 with the other side of the armature. The energization of winding 191 will draw up its core and a sliding brush carried on its lower end to gradually insert resistance 190 in parallel with the armature to thereby put a load on the armature. It is to be noted that magnet winding 191 cannot be energized until the magnet 177 has been deënergized and that magnet winding 186 which controls the field resistance cannot be energized until the magnet 191 has been deënergized.

If the operator moved the car switch lever 142' to the left to cause the car to run down, the operations would be similar to those previously described. The circuit closed at car switch contact 200 would however pass through contacts 99^A of the automatic stop device and through magnet winding 203 of the reversing switch. The latter would cause the left hand side of the reversing switch to be closed instead of the right hand side and this would cause the current to pass through the motor armature in the opposite direction to cause the rotation of the motor and the direction of movement of the car to be opposite to that which they had previously. The circuit closed at car switch contact 201 would pass through contacts 98^A, and the circuit closed at contact 202 would pass through contacts 97^A. Therefore to automatically reverse the starting operation the cams actuated by sheave 45 would be brought into action to successively open switches 97, 98 and 99. If cam 101 moves far enough to engage its roller 110 it will close switch 84, therefore the closure of this switch 84 acts to slow down the car when its direction of travel is either up or down. It has been shown that the switch 100 is automatically opened whenever the car runs away. When it does open it breaks the circuit between the reversing switch magnets 147 and 203 and also to the starting switch magnet 148. This then applies the brake and cuts off the current supply to the motor and to the starting resistance controller magnet 177 and the field resistance magnet 186 thus insuring the stopping of the elevator.

It may now be seen that by the use of my invention the automatic stop device comes into action as the car approaches the limits of its travel and is actuated by the car at a rate proportional to the rate of movement of the car as is usual with devices of this class, but that if the car's speed is excessive the rate at which the stop device is actuated is greatly increased. Moreover, the speed of the driving motor is retarded if it gets too great during any portion of the travel of the car. And finally if the speed of the car becomes so excessive as to cause the car safety device to be thrown in, the driving power is simultaneously shut off and the brake applied to the hoisting mechanism.

I have described the operation of my invention in connection with an embodiment thereof which is especially designed for use in connection with an electric elevator, but in its broad aspects this invention is also applicable to other types of elevators.

In some of the appended claims I have specified that the stop device is driven at a rate proportional to that of the car. This means that the sheaves 35 and 45 will when driven by the car rotate at a rate substantially proportional to the speed of the car, although of course this rotation will begin easily so that at the beginning of the operation its rotation will be slower.

What I claim is:

1. In an elevator, a car, a stop device therefor adapted to be actuated as the car approaches the limit of its travel, and means for changing the rate of action of the stop device when the speed of the car varies beyond a predetermined limit.

2. In an elevator, a car, a stop device therefor adapted to be actuated as the car approaches the limit of its travel at a rate substantially proportional to the speed of the car, and means for increasing the rate of action of the stop device in relation to the speed of the car, when the speed of the car exceeds a predetermined rate.

3. In an elevator, a car, a stop device therefor, means for causing the car as it approaches the limit of its travel to actuate the stop device at a rate substantially proportional to the speed of the car, and mechanism for changing the proportional rate of action of the stop device.

4. In an elevator, a car, a stop device therefor, means for causing the car as it approaches the limit of its travel to actuate the stop device at a rate substantially proportional to the speed of the car, and mechanism for increasing the proportional rate of action of the stop device when the speed of the car exceeds a predetermined rate.

5. In an elevator, a car, a stop device therefor comprising a plurality of devices for gradually bringing the car to a stop, means for actuating the stop device as the car approaches the limit of its travel to successively actuate said devices at different points of the travel of the car, and means dependent upon the speed of the car for automatically changing the points of travel of the car at which said devices are actuated.

6. In an elevator, a car, a stop device therefor comprising a plurality of devices for gradually bringing the car to a stop, means driven by the car as it approaches the limit of its travel for successively actuating said devices at different points of the travel of the car, and means actuated by the car when the speed thereof exceeds a predetermined rate, for causing the points of travel of the car at which said devices are actuated, to be nearer together.

7. In an elevator, a car, a stop device therefor comprising a plurality of devices for gradually bringing the car to a stop, means for actuating the stop device as the car approaches the limit of its travel to successively actuate said devices at a rate substantially proportional to the speed of the car, and means for automatically changing said proportional rate.

8. In an elevator, a car, a stop device therefor comprising a plurality of devices for gradually bringing the car to a stop, means for actuating the stop device as the car approaches the limit of its travel to successively actuate said devices at a rate substantially proportional to the speed of the car, and means for automatically increasing said proportional rate when the speed of the car exceeds a predetermined rate.

9. In an elevator, a car, a stop device therefor comprising a plurality of devices for gradually bringing the car to a stop, and means for causing the car to actuate the stop device as the car approaches the limit of its travel, to actuate said devices successively at a rate substantially proportional to the speed of the car, said stop device comprising means for automatically increasing said proportional rate when the speed of the car exceeds a predetermined rate.

10. In an elevator, a car, a stop device therefor, said device comprising an actuating member and a plurality of devices for gradually bringing the car to a stop, said member being arranged to be moved as the car approaches the limit of its travel at a rate substantially proportional to the speed of the car, and connections for causing said member to successively actuate said devices at a rate proportional to that of the member, or at a different rate.

11. In an elevator, a car, a stop device therefor, said device comprising an actuating member and a plurality of devices for gradually bringing the car to a stop, said member being arranged to be moved as the car approaches the limit of its travel at a rate substantially proportional to the speed of the car, connections for causing said member to successively actuate said devices at a rate proportional to that of the member, or at a different rate, and means for changing said connections.

12. In an elevator, a car, a stop device therefor, said device comprising an actuating member and a plurality of devices for gradually bringing the car to a stop, said member being arranged to be moved as the car approaches the limit of its travel at a rate substantially proportional to the speed of the car, connections for causing said member to successively actuate said devices at a rate proportional to that of the member, or at a different rate, and means for changing said connections to change the rate of actuation of said devices proportional to the movement of the actuating member, said connection changing means being dependent upon the speed of the car.

13. In an elevator, a car, a stop device therefor, said device comprising an actuating member and a plurality of devices for gradually bringing the car to a stop, said member being arranged to be moved as the car approaches the limit of its travel at a rate substantially proportional to the speed of the car, connections for causing said member to successively actuate said devices at a rate proportional to that of the member, or at a different rate, and means for automatically changing said connections to increase the rate of actuation of said devices proportional to that of the movement of the actuating member, said connection changing means being made operative by a speed of the car above a predetermined maximum.

14. In an elevator, a car, a stop device therefor adapted to be actuated as the car approaches the limit of its travel, at a rate substantially proportional to the speed of the car, and a speed governor arranged to increase the rate of action of the stop device in relation to speed of the car when the speed of the car exceeds a predetermined rate.

15. In an elevator, a car, a stop device therefor, and driving mechanism arranged to be engaged by the car as the car approaches the limit of its travel, for actuating the stop device at a rate substantially proportional to the speed of the car, said mechanism comprising a speed governor arranged to change said proportional rate of action of the stop device.

16. In an elevator, a car, a stop device therefor, and driving mechanism arranged to be engaged by the car as the car approaches the limit of its travel, for actuating the stop device at a rate substantially proportional to the speed of the car, said mechanism comprising a speed governor arranged to increase said proportional rate of action of the stop device when the speed of the car exceeds a predetermined rate.

17. In an elevator, a car, a stop device therefor comprising a plurality of devices for gradually bringing the car to a stop, and driving mechanism arranged to be engaged by the car as the car approaches the limit of its travel, to successively actuate said devices at a rate substantially proportional to the speed of the car, said driving mechanism comprising a speed governor arranged to automatically increase said proportional rate of action of said devices when the speed of the car exceeds a predetermined rate.

18. In an elevator, a car, a stop device therefor, said device comprising an actuating member and a plurality of devices for gradually bringing the car to a stop, driving mechanism arranged to be engaged by the car as the car approaches the limit of its travel for moving said actuating member at a rate substantially proportional to the speed of the car, connections for causing said member to successively actuate said devices at a rate proportional to that of the member or at a different rate, and a speed governor in said mechanism arranged to automatically change said connections to increase the rate of actuation of said devices proportional to the movement of the actuating member when the speed of the car exceeds a predetermined rate.

19. In an elevator, a car, a stop device therefor, a rope connected with said device and arranged to be engaged by the car as it approaches one of the limits of its travel to actuate said device at a rate substantially proportional to the speed of the car, and means for increasing the rate of action of the stop device in relation to the speed of the car, when the speed of the car exceeds a predetermined rate.

20. In an elevator, a car, a stop device therefor, a rope connected with said device and arranged to be engaged by the car as it approaches one of the limits of its travel to actuate said device at a rate substantially proportional to the speed of the car, and mechanism for increasing the proportional rate of action of the stop device when the speed of the car exceeds a predetermined rate.

21. In an elevator, a car, a stop device therefor, a rope connected with a part of said device arranged to be engaged by the car as it approaches the upper limit of its travel to actuate the connected part of said device at a rate substantially proportional to the speed of the car, a second rope connected with another part of said device arranged to be engaged by the car as it approaches the lower limit of its travel to actuate said other connected part of the stop device at a rate substantially proportional to the speed of the car, and means for automatically changing the rate of action of either actuated part of the stop device.

22. In an elevator, a stop device therefor comprising a shaft adapted to be rotated as the car approaches the limit of its travel, a plurality of devices for gradually bringing the car to a stop, a plurality of cams arranged to be rotated in unison with the shaft to actuate successively said devices, and means for causing said cams to rotate faster than the shaft when the speed of the car exceeds a predetermined rate.

23. In an elevator, a stop device therefor comprising a shaft adapted to be rotated as the car approaches the limit of its travel, a plurality of devices for gradually bringing the car to a stop, a plurality of cams surrounding said shaft arranged to be rotated and moved longitudinally to actuate successively said devices, and means for increasing the rate of action of said devices when the speed of the car exceeds a predetermined rate.

24. In an elevator, a car, a stop device therefor, comprising a shaft and a plurality of devices for bringing the car to a stop, means for causing the car as it approaches the limit of its travel, to rotate the shaft at a rate substantially proportional to the speed of the car, means moved by the rotation of said shaft for successively actuating said devices, and gearing automatically put into action when the speed of the car exceeds a predetermined rate, for increasing the rate of movement of said actuating devices.

25. In an elevator, a car, a stop device therefor, comprising a shaft and a plurality of devices for bringing the car to a stop, means for causing the car as it approaches the limit of its travel, to rotate the shaft at a rate substantially proportional to the speed of the car, a plurality of cams moved with the shaft for successively actuating said devices, multiplying gearing for increasing the rate of movement of the cams relative to that of the shaft, a holding device for rendering said gearing inoperative to increase the rate of movement of the cams, and means automatically actuated by the car when the speed of the car exceeds a predetermined rate, for releasing said holding device.

26. In an elevator, a car, a stop device therefor, comprising a shaft and a plurality of devices for bringing the car to a stop, means for causing the car as it approaches the limit of its travel, to rotate the shaft at a rate substantially proportional to the speed of the car, a plurality of cams moved with the shaft for successively actuating said devices, multiplying gearing for increasing the rate of movement of the cams relative to that of the shaft, and a speed governor mounted upon said shaft and arranged to set said gearing into action when the speed of the shaft exceeds a predetermined rate.

27. In an elevator, a motor, a stop device therefor, a speed increasing element for the motor, a controller for said element, said stop device comprising means for actuating said controller to cut out the speed increasing element and other means for directly cutting out said element.

28. In an elevator, a motor, a car, a stop device therefor, arranged to be actuated by the car as it approaches the limit of its travel, a speed increasing element for the motor, a controller for said element, said stop device comprising means for actuating said controller to cut out the speed increasing element and other means for directly cutting out said element, said means being actuated at different times, and means automatically controlled by the speed of the car for changing the interval between said times of actuation.

29. In an elevator, a motor, a car, a stop device therefor, means for causing one part of the stop device to be driven by the car as it approaches the upper limit of its travel and another part of said device to be driven by the car as it approaches the lower limit of its travel; a speed increasing element for the motor, a controller for said element, each driven part of the stop device comprising a device for actuating said controller to cut out the speed increasing element, and another device actuated by either of said parts of the stop device for directly cutting out said element.

30. In an electric elevator, an electric motor, a car, a switch in the car comprising a plurality of operative contacts, a stop device for the car comprising a plurality of contacts each operatively connected with one of the car switch contacts, means for actuating the stop device as the car approaches the limit of its travel to successively open its contacts at a rate substantially proportional to the speed of the car, and means for changing the rate of actuation of the stop device when the speed of the car varies beyond a predetermined limit.

31. In an electric elevator, an electric motor, a car, a switch in the car comprising a plurality of operative contacts, a stop device for the car comprising a plurality of contacts each operatively connected with one of the car switch contacts, means for actuating the stop device as the car aproaches the limit of its travel to successively open its contacts at a rate substantially proportional to the speed of the car, and means dependent upon the speed of the car for automatically increasing the rate of actuation of the stop device in relation to the speed of the car.

32. In an electric elevator, an electric motor, a car, a switch in the car comprising one set of contacts for the up motion of the car, a second set of contacts for the down motion of the car, a stop device for the car comprising a set of contacts operatively connected with said first set of car switch contacts and a second set of contacts operatively connected with said second set of car switch contacts, driving mechanism for the stop device arranged to be engaged by the car as it approaches the upper limit of its travel arranged to successively open the first set of stop device contacts, and other driving means for the stop device arranged to successively open the second set of stop device contacts; said driving mechanisms being arranged to actuate the stop device at a rate substantially proportional to the speed of the car and each comprising means for increasing said rate of actuation when the speed of the car exceeds a predetermined limit.

33. In an electric elevator, an electric motor, a car, a stop device therefor comprising a plurality of switches for gradually bringing a car to a stop, means for actuating the stop device as the car approaches the limit of its travel to successively actuate said switches at different points of the travel of the car, and means dependent upon the speed of the car for automatically changing the points of travel of the car at which said switches are actuated.

34. In an electric elevator, an electric motor, a car, a stop device therefor comprising a plurality of switches for gradually bringing the car to a stop, means for actuating the stop device as the car approaches the limit of its travel to successively actuate the switches at a rate substantially proportional to the speed of the car, and means for automatically increasing said proportional rate when the speed of the car exceeds a predetermined rate.

35. In an electric elevator, an electric motor, a car, a stop device therefor comprising an actuating member and a plurality of switches for gradually bringing the car to a stop, said member being arranged to be moved as the car approaches the limit of its travel at a rate substantially proportional to the speed of the car, connections for causing said member to successively actuate the switches at one rate proportional to that of the member, or at a different rate, and means for changing said connections to change the rate of actuation of the switches proportional to the movement of the actuating member, said connection changing means being dependent upon the speed of the car.

36. In an electric elevator, an electric motor, a car, a stop device therefor comprising a shaft adapted to be rotated as the car approaches the limit of its travel, a plurality of switches for gradually bringing the car to a stop, a plurality of cams arranged to be rotated in unison with the shaft to actuate successively said switches, and means for causing said cams to rotate faster than the shaft when the speed of the car exceeds a predetermined rate.

37. In an electric elevator, an electric motor, a car, a stop device therefor comprising a shaft and a plurality of switches for bringing the car to a stop, means for causing the car as it approaches the limit of its travel to rotate the shaft at a rate substantially proportional to the speed of the car, a plurality of cams moved with the shaft for successively actuating said devices, multiplying gearing for increasing the rate of movement of the cams relative to that of the shaft, and a speed governor mounted upon said shaft and arranged to set said gearing into action when the speed of the shaft exceeds a predetermined rate.

38. In an electric elevator, an electric motor, a car, a stop device therefor, a shunt field resistance for the motor, a controller for said resistance, said stop device comprising means for actuating the controller to cut out the resistance and other means for directly cutting out the resistance.

39. In an electric elevator, an electric motor, a car, a stop device therefor arranged to be actuated by the car as it approaches the limit of its travel, a field resistance for increasing the speed of the motor, an electro-magnetic controller for said resistance, said stop device comprising means for actuating said controller to cut out the field resistance and other means for directly cutting out said resistance, said means being actuated at different times, and means automatically controlled by the speed of the car for changing the interval between said times of actuation.

40. In an electric elevator, an electric motor, a car, a stop device therefor, means for causing one part of the stop device to be driven by the car as it approaches the upper limit of its travel and other means for causing another part of said device to be driven by the car as it approaches the lower limit of its travel; a field resistance for increasing the speed of the motor, an electro-magnetic controller for said resistance, each driven part of the stop device comprising a switch for actuating said controller to cut out the field resistance, and another device actuated by either of said parts of the stop device for directly cutting out said resistance.

41. In an elevator, a car, a speed governor driven thereby, an automatic terminal stop device for the car, driving mechanism arranged to be engaged by the car as the car approaches the limit of its travel for actuating the stop device in successive operations, and an actuating connection between the governor and the stop device.

42. In an elevator, a car, a speed governor driven thereby, a stop device for the car, means for actuating the stop device by the car at a rate substantially proportional to the speed of the car, a secondary governor arranged to change the rate of actuation of the stop device, and an independent actuating connection between the first speed governor and the stop device.

43. In an elevator, a car, a speed governor driven thereby, a stop device for the car, said stop device comprising an element for retarding the speed of the car and other devices for bringing the car to a stop, means for actuating the stop device by the movement of the car, and means for actuating the retarding element by the governor.

44. In an elevator, a car, a speed governor driven thereby, a stop device for the car, said stop device comprising an element for retarding the speed of the car and other devices for bringing the car to a stop, means for actuating the stop device by the movement of the car and another element in said stop device actuated by the governor for insuring the stopping of the car.

45. In an elevator, a motor, a car, a speed governor driven thereby, a stop device for the car arranged to be actuated by the car as it approaches the limit of its travel, a speed increasing element for the motor, a controller for said element, said stop device comprising means for actuating said controller to cut out the speed increasing element and other means for directly cutting out said element, and an independent actuating connection between the governor and said other means.

46. In an elevator, a car, a safety device thereon, a speed governor driven by the car and arranged to actuate said safety device, an automatic terminal stop device for the car, driving mechanism arranged to be engaged by the car as the car approaches the limit of its travel for actuating the stop device, and an actuating connection between the governor and the stop device.

47. In an elevator, a motor, a car, a safety device thereon, a speed governor driven by the car and arranged to actuate said safety device, an automatic terminal stop device for the car, said stop device comprising an element for retarding the speed of the car and other devices for bringing the car to a stop, means for actuating the stop device by the movement of the car, and another element in said stop device actuated by the governor when the governor acts to apply the car safety device, to cut off the power from the motor.

48. In an electric elevator, a car, a safety device thereon, a speed governor driven by the car and arranged to actuate said safety device, a switch in the car comprising a plurality of operative contacts, a stop device for the car comprising a plurality of contacts each operatively connected with one of the car switch contacts, means for actuating the stop device as the car approaches the limit of its travel to successively open its contacts at a rate substantially proportional to the speed of the car, and means for changing the rate of actuation of the stop device when the speed of the car varies beyond a predetermined limit, and an independent actuating connection between the speed governor and the stop device.

49. In an electric elevator, a car, a safety device thereon, a speed governor driven by the car and arranged to actuate said safety device, a switch in the car comprising a plurality of operative contacts, a stop device for the car comprising a plurality of contacts each operatively connected with one of the car switch contacts, means for actuating the stop device as the car approaches the limit of its travel to successively open its contacts at a rate substantially proportional to the speed of the car, and means dependent upon the speed of the car for automatically increasing the rate of actuation of the stop device in relation to the speed of the car, and an independent actuating connection between the speed governor and the stop device arranged to cause the speed of the car to be retarded when its speed exceeds a predetermined rate.

50. In an electric elevator, a car, a speed governor driven by the car, a switch in the car comprising a plurality of operative contacts, a stop device for the car comprising a plurality of contacts each operatively connected with one of the car switch contacts, means for actuating the stop device as the car approaches the limit of its travel to successively open its contacts at a rate substantially proportional to the speed of the car, means dependent upon the speed of the car for automatically increasing the rate of actuation of the stop device in relation to the speed of the car, and an independent actuating connection between the speed governor and the stop device arranged to cause the speed of the car to be retarded when its speed exceeds a predetermined rate, and to stop the motor when the speed of the car exceeds a greater predetermined limit.

51. In an electric elevator, a car, a safety device thereon, a speed governor driven by the car, and arranged to actuate said safety device, a switch in the car comprising a plurality of operative contacts, a stop device for the car comprising a plurality of contacts each operatively connected with one of the car switch contacts, means for actuating the stop device as the car approaches the limit of its travel to successively open its contacts at a rate substantially proportional to the speed of the car, means dependent upon the speed of the car for automatically increasing the rate of actuation of the stop device in relation to the speed of the car, and an independent actuating connection between the speed governor and the stop device arranged to cause the speed of the car to be retarded when its speed exceeds a predetermined rate, and to stop the motor and apply the car safety device when the speed of the car exceeds a greater predetermined limit.

52. In an electric elevator, an electric motor, a car, a stop device therefor, a field resistance for the motor, a controller for said resistance, said stop device comprising means for actuating the controller to cut out the resistance and other means for directly cutting out the resistance, and a speed governor driven by the car and arranged to independently actuate said other means for directly cutting out the field resistance.

53. In an electric elevator, an electric motor, a car, a stop device therefor arranged to be actuated by the car as it approaches the limit of its travel, a field resistance for increasing the speed of the motor, an electromagnetic controller for said resistance, said stop device comprising means for actuating said controller to cut out the field resistance and other means for directly cutting out said resistance, said means being actuated at different times, means automatically controlled by the speed of the car for changing the interval between said times of actuation, and a speed governor driven by the car and arranged to independently actuate said other means for directly cutting out the field resistance.

54. In an electric elevator, an electric motor, a car, a stop device therefor arranged to be actuated by the car as it approaches the limit of its travel, a field resistance for increasing the speed of the motor, an electro-magnetic controller for said resistance, said stop device comprising means for actuating said controller to cut out the field resistance and other means for directly cutting out said resistance, said means being actuated at different times, means automatically controlled by the speed of the car for changing the interval between said times of actuation, a safety device on the car, and a speed governor driven by the car and arranged to actuate the car safety device, said governor being arranged to independently actuate said other means for cutting out the field resistance and to cut off the motor when it acts to apply the car safety device.

55. In an electric elevator, an electric motor, a car, a stop device therefor, means for causing one part of the stop device to be driven by the car as it approaches the upper limit of its travel and other means for causing another part of said device to be driven by the car as it approaches the lower limit of its travel; a field resistance for increasing the speed of the motor, an electro-magnetic controller for said resistance, each driven part of the stop device comprising a switch for actuating said controller to cut out the field resistance, and another device actuated by either of said parts of the stop device for directly cutting out said resistance, a safety device on the car, and a speed governor driven by the car and arranged to actuate the car safety device, said governor being arranged to independently actuate said other device for cutting out the field resistance and to cut off the motor when it acts to apply the car safety device.

56. In an elevator, a car, a safety device thereon and an automatic terminal stop device for the car, said stop device comprising means for applying the car safety device.

57. In an elevator, a car, a safety device thereon, and an automatic terminal stop device for the car, said stop device comprising means for bringing the car to a stop at the end of its travel and other means for applying the car safety device if the car fails to stop.

58. In an elevator, a car, a safety device thereon, and an automatic terminal stop device for the car, said stop device comprising means for slowing the car and gradually bringing the car to a stop in successive steps at the end of its travel, and for applying the car safety device if the car fails to stop.

59. In an elevator, a car, a safety device thereon, and a stop device for the car, said stop device comprising means for slowing the car and gradually bringing the car to a stop in successive steps at the end of its travel, and for applying the car safety device if the car fails to stop, said steps and safety device applying means being arranged to act at predetermined points along the path of travel of the car, and means dependent upon the speed of the car for automatically changing said points.

60. In an elevator, a car, a safety device thereon, and a stop device for the car, said stop device comprising means for slowing the car and gradually bringing the car to a stop in successive steps at the end of its travel, and for applying the car safety device if the car fails to stop and means dependent upon the speed of the car for shortening the interval between said steps when the speed of the car exceeds a predetermined rate.

61. In an elevator, a car, a safety device thereon, a stop device for the car, said stop device comprising means for applying the car safety device and means dependent upon the speed of the car for causing said car safety device applying means to act before the car reaches the end of its path of travel when the speed of the car exceeds a predetermined rate.

62. In an elevator, a car, a safety device thereon, a speed governor driven by the car and arranged to actuate said safety device, a stop device for the car, means for actuating the stop device by the movement of the car and connections between said speed governor and the stop device whereby either can effect the operation of the other.

63. In an elevator, a car, a safety device thereon, a speed governor driven by the car and arranged to actuate said safety device, a stop device for the car, means for actuating the stop device by the movement of the car and other means for actuating the stop device by the governor, said stop device also comprising means for actuating said car safety device.

64. In an electric elevator, an electric motor, a car, a safety device thereon, a stop device for the car arranged to be driven as the car approaches the limit of its travel, a field resistance for the motor, a controller for said resistance, said stop device comprising means for actuating the controller to cut out the resistance, a switch for directly cutting out the resistance and a device to cut off power from the motor and to apply the car safety device: and a speed governor driven by the car arranged to actuate said stop device switch for directly cutting out the field resistance, and to apply the car safety device and actuate the stop motion device for cutting off power from the motor.

65. In an elevator, a car, a safety device thereon, a speed governor driven by the car and arranged to actuate said safety device, an automatic terminal stop device for the car comprising means for slowing down the car and for applying the car safety device, means for actuating said terminal stop device by the movement of the car, and other means for actuating the slow-down means thereof and the car safety applying means thereof by the governor.

In witness whereof, I have hereunto set my hand this 23 day of April in the year 1912.

ANDREW M. COYLE.

Witnesses:
NORMAN J. TAYLOR,
C. S. BURNHAM.

Copies of this patent may be obtained for five cents each, by addressing the "Commissioner of Patents, Washington, D. C."